W. H. KRAMER.
SAW FILING DEVICE.
APPLICATION FILED MAY 31, 1918.
1,328,159.
Patented Jan. 13, 1920.
2 SHEETS—SHEET 1.
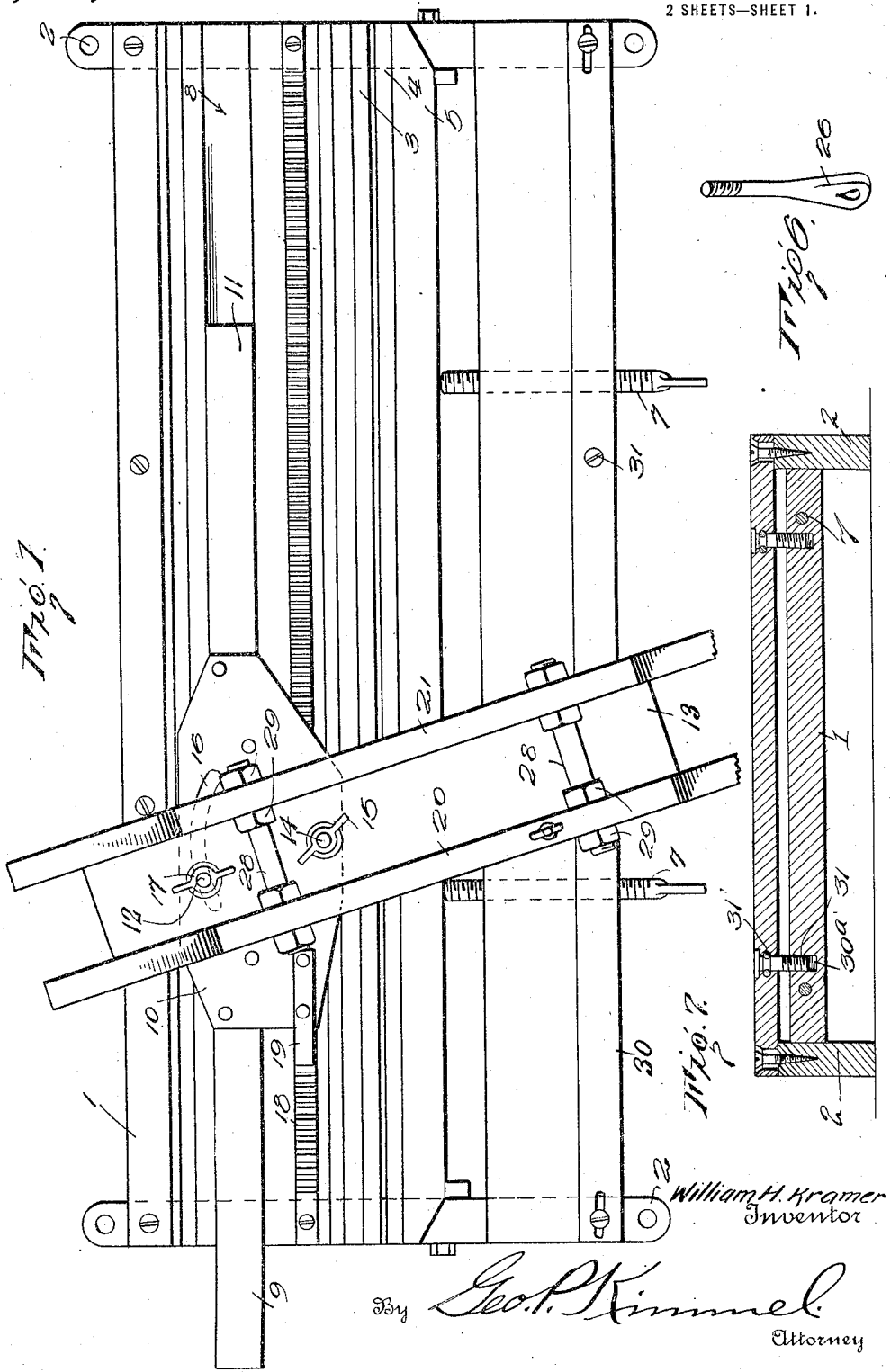
William H. Kramer
Inventor
By Geo. P. Kimmel
Attorney W. H. KRAMER.
SAW FILING DEVICE.
APPLICATION FILED MAY 31, 1918.
1,328,159.
Patented Jan. 13, 1920.
2 SHEETS—SHEET 2.
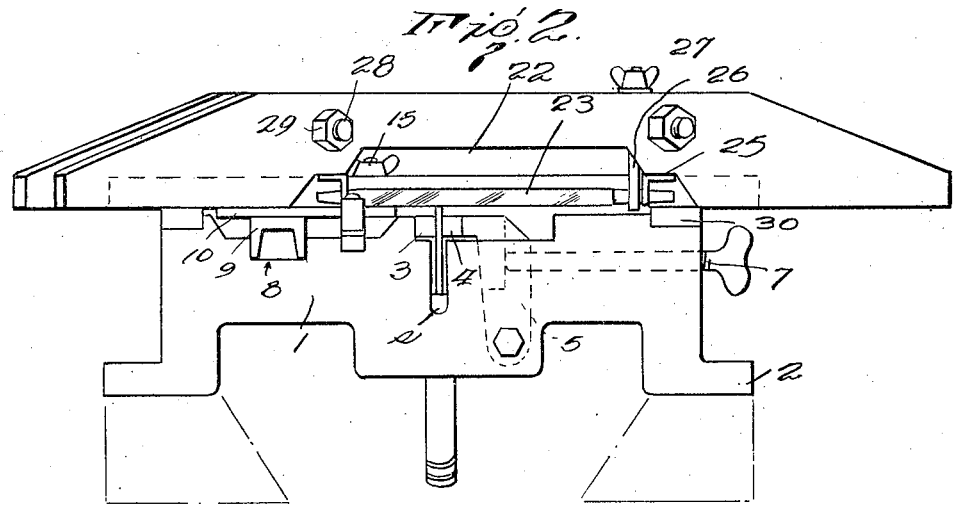
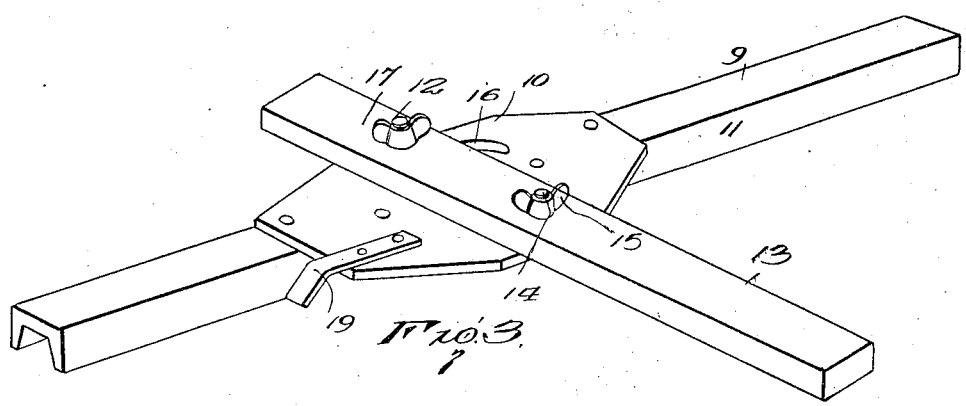
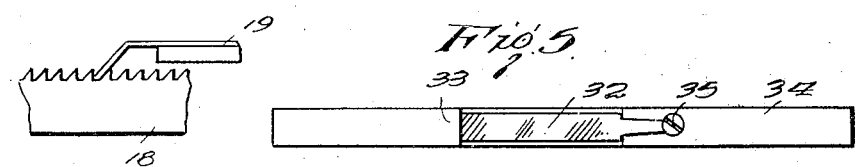
William H. Kramer
Inventor
By Geo. P. Kimmel
Attorney

UNITED STATES PATENT OFFICE.

WILLIAM H. KRAMER, OF NEWCASTLE, INDIANA.

SAW-FILING DEVICE.

1,328,159.  Specification of Letters Patent.  Patented Jan. 13, 1920.

Application filed May 31, 1918. Serial No. 237,424.

*To all whom it may concern:*

Be it known that I, WILLIAM H. KRAMER, a citizen of the United States, residing at Newcastle, in the county of Henry and State of Indiana, have invented certain new and useful Improvements in Saw-Filing Devices, of which the following is a specification.

This invention relates to improvements in saw filing devices and it is the principal object of the invention to provide a device for facilitating the adjusting or sharpening of saws in an accurate and expeditious manner; all undue movement of the saw during the adjusting operation being positively prevented.

Another and equally important object of the invention is to provide the device with a novel form of file holder whereby the proper engagement of the file with the teeth will be insured, thus aiding the filing of the same at relatively uniform angles.

It is also an object of the invention to provide gage and guide means for the file holder whereby the same can be caused to follow the contour of the cutting edge of the saw and prevented from cutting the teeth thereof to too great a depth.

All of the foregoing together with additional advantageous details and arrangement of parts of the preferred embodiment of my invention will be clear from the specific description hereinafter contained, when read in connection with the accompanying drawings forming part thereof, wherein said embodiment of the invention is illustrated for the purpose of facilitating a full understanding of the present improvements.

In these drawings:

Figure 1 is a top plan view of the improved filing device,

Fig. 2 is an end elevation thereof,

Fig. 3 is a detail in perspective of the file or jointer holder,

Fig. 4 is a fragmentary detail in elevation showing the means for maintaining the file holder or jointer in adjusted position with relation to the saw teeth, Fig. 5 is a bottom plan of one side of a modified file holder or jointer showing the manner of attaching the file thereto, Fig. 6 is a detail in perspective of the file securing bolt, and Fig. 7 is a fragmentary detail in section showing the connection of one of the flexible wood strips with the frame.

Having more particular reference to the drawings, in connection with which like reference characters will designate corresponding parts throughout the several views of the drawings, 1 represents the frame of the device, the opposite ends of which are formed with laterally extending apertured ears 2 whereby to permit the securing thereof to a suitable object or support. Disposed longitudinally of the frame 1 is an immovable clamping jaw 3, while a movable clamping jaw 4 is arranged adjacent the same and is adapted to be engaged by a pivoted arm 5 mounted on said frame as at 6 and having its upper end formed with an extension adapted to be engaged with the adjacent marginal portion of said movable jaw 4; adjusting screws 7 passing through screw threaded openings formed in the sides of said frame into engagement with the adjacent portions of the pivoted arm 5 to effect the movement of the movable jaw 4 into engagement with the saw arranged between the same and the jaw 3 indicated by the reference letter *s*.

A groove or way 8 is formed in the frame 1 and as will be noted, extends longitudinally thereof, and serves to slidably receive a bar 9 therein, which bar in turn has a plate 10 secured thereto by means of rivets 11 or other suitable fastening devices. An adjusting screw 12 is carried by a file holder guide piece 13 pivoted to the opposite side of the plate 10 by means of a second screw 14 passing therethrough and through the plate and having a wing nut 15 turned into engagement with the upper screw threaded extremity thereof. This set-screw 12 extends downwardly through an arcuate slot 16 formed in the plate 10 and to connect the same to said plate a wing nut 17 is turned into engagement with the upper screw threaded portion thereof. Hence, by tightening the wing nut 17 it is obvious that the screw 12 will be clampingly engaged with the plate 10 and as a consequence, maintains the guide piece 13 in adjusted position with relation to the saw *s* to be filed.

A longitudinally disposed ratchet bar 18 is supported on the frame 1 and is adapted to have the various teeth formed thereon engaged by a spring pawl 19 carried on the rear end of the plate 10. In this way, it will be readily understood that the plate and the guide piece 13 will be properly spaced with relation to the teeth of the saw and thus insure proper filing or sharpening of the same.

The file holder or jointer comprises spaced guide members 20 and 21 having their opposite ends beveled, while the lower sides thereof are cutaway or recessed as at 22, the recessed portions of the side member 20 having a file 23 positioned adjacent the same, one end of the file being engaged in an angle bracket 24 while the opposite end or tang thereof is engaged in a slotted angle bracket 25 and by the right angular end of a screw member 26, the shank portion of which passes upwardly through said side member and has a wing nut 27 turned into engagement with the upper end thereof. These side members 20 and 21 are connected to each other and maintained in spaced relation by means of bolts 28 having locking nuts 29 turned into engagement therewith, and bearing upon the opposite sides of the members. In this connection, it is to be noted that the distance between the side members 20 and 21 is such as to permit the same to straddle the guide piece 13 and consequently, upon reciprocation of the same during the filing of a saw, proper movement will be insured.

To provide means for gaging the depth of the cut of a file and to cause the holder to be guided in a manner to conform to or follow out the contour of the cutting edge of a saw, I arrange flexible wooden strips 30 in rabbeted portions formed on the opposite sides of the frame 1 and extending longitudinally thereof, said strips having set-screws 31 passing therethrough and swivelly connected to the same, as at 31' the screw threaded shanks of which are engaged in corresponding screw threaded openings 30ª formed in said frame. Thus, by turning the screws 31, the flexible strips may be bowed upon themselves to provide a track or guide for the opposite end of the holder to rest upon during its movement over the frame 1 throughout the length of the saw. By so guiding the holder, it is apparent that the depth of the cuts of the various saw teeth will be properly gaged. It of course will be understood, in this connection, that the spring pawl 19 will properly function with respect to the ratchet bar 18 irrespective of the flexing or bowing of said strips 30 due to its resiliency, thus, properly spacing the holder with relation to the saw teeth.

In the Fig 5 I have shown a slightly modified form of connection between one of the side members of the holder or jointer and the file, wherein the file is indicated by the numeral 32 and has one end thereof engaged under an undercut portion or lip 33 formed on the lower marginal portion of the side member 34 while the tang portion thereof is engaged by a screw 35 passing into said member 34.

In using the improved sharpening device, a saw is arranged between and then clamped by the jaws 3 and 4 through the medium of the adjusting screws 7 and the pivoted arm 5. At this time, the file holder is moved to one end of the frame 1 whereupon, if necessary, the flexible strips 30 are bowed or flexed upon themselves to conform to or follow out the contour of the cutting edge of the saw. At this time, the guide piece 13 is properly adjusted with relation to the angles of the cuts on the saw teeth and is then locked in its adjusted position by means of the screw 12 and wing nut 17. The holder or jointer is now placed over the guide piece 13, that is, caused to straddle the same and is then reciprocated, thus bringing the file 23 into engagement with the teeth in sequential order. As one tooth is filed, the bar 9 is moved over the frame whereupon the spring pawl 19 will engage the next tooth element of the ratchet bar 18. When the alternate teeth of the saw have been properly filed, the saw or the guide piece can then be reversed and the intermediate teeth of the same filed.

Manifestly, the construction shown is capable of considerable modification and such modification as is within the scope of my claims, I consider within the spirit of my invention.

I claim:

1. In a saw filing device, a frame, clamping means on said frame, file guiding means slidable on the frame, and adjustable flexible strips secured to the opposite side portions of the frame whereby to permit gaging of the file guiding means.

2. In a saw filing device, a frame having a longitudinally disposed way formed in its upper face, saw clamping means arranged adjacent said way, an adjustable pivoted file guiding mens slidable in said way, means for effecting the step-by-step movement of said file guiding means over the frame, and flexible adjustable strips secured to the opposite sides of the frame whereby to permit gaging of the file guiding means.

3. In combination with a saw filing device including a frame having an adjustable file guiding means slidable thereover, a file holder comprising spaced side members adapted to straddle said guide means, portions of the file holder being recessed, and a file carried by said holder adjacent the recessed portions.

4. In a saw filing device, a frame, saw retaining means on said frame, pivoted file guiding means slidable on the frame, and adjustable flexible strips secured to the opposite side portions of the frame whereby to permit gaging of the file holder.

5. In a saw filing device, a frame, saw retaining means on said frame, file guiding means pivoted to the frame and slidable thereover, means for permitting the step-by-step advancement of said file guiding means over the frame, and flexible strips secured to the opposite side portions of the frame whereby to permit gaging of the file holder.

In testimony whereof, I affix my signature hereto.

WILLIAM H. KRAMER.